June 4, 1968  K. H. BRECH  3,387,257

PULSE CIRCUIT FOR PULSE ECHO ULTRASONIC TESTING

Filed Jan. 25, 1967

INVENTOR.
KILIAN H. BRECH
BY
Erwin B. Steinberg

__United States Patent Office__

3,387,257
Patented June 4, 1968

3,387,257
PULSE CIRCUIT FOR PULSE ECHO
ULTRASONIC TESTING
Kilian H. Brech, Norwalk, Conn., assignor to Branson Instruments, Incorporated, Stamford, Conn., a corporation of Delaware
Filed Jan. 25, 1967, Ser. No. 611,719
5 Claims. (Cl. 340—15)

ABSTRACT OF THE DISCLOSURE

In a pulse circuit for pulsing a piezoelectric transducer using a capacitor which is alternately charged and discharged responsive to the condition of a switching means, a rectifying means is connected in circuit between the transducer and the capacitor in order to block current flow to the transducer when the switching means changes from the conductive to the non-conductive state and causes the capacitor to become charged.

This invention refers to a new and improved pulse circuit for ultrasonic pulse-echo testing. Quite specifically, the invention concerns a pulse circuit for an ultrasonic piezoelectric transducer adapted to be coupled to a workpiece for sending a high frequency ultrasonic pulse into the workpiece and thereafter receives echo signals which are responsive to a change in acoustic impedance encountered by the pulse signal.

While there has been designed a variety of pulse circuits for pulse-echo testing, there have become evident also certain shortcomings and problems which have not as yet successfully been solved. Problems which have arisen and to which effort has been directed concern the recovery time of the pulse circuit subsequent the initial search pulse has been applied to the transducer. In almost all of the circuits in use a piezoelectric transducer, after being pulsed, remains coupled to a relatively low impedance circuit until this pulse generating circuit has fully recovered. This coupling causes the piezoelectric crystal, which serves also as a search unit, to be relatively insensitive to signals occurring immediately after the search signal has been sent. The present invention includes means for improving this condition by providing electrical isolating means between the charging circuit and the piezoelectric transducer in order to restore the sensitivity of the transducer immediately after the search pulse has been transmitted.

One of the principal objects of this invention is, therefore, the provision of a new and improved pulse circuit for ultrasonic pulse-echo testing.

Another important object of this invention is the provision of a pulse-echo ultrasonic circuit in which unwanted signals are suppressed.

Another object of this invention is the provision of an electrical circuit for pulse-echo testing in which the transducer is quickly restored to its pulse receiving condition.

Still another important object of this invention is the provision of electrical circuit isolating means interposed between an ultrasonic pulse-echo transducer and the pulse generating circuit in order to render the transducer more sensitive to echo responsive signals which occur shortly after the search pulse has been sent.

Further and other objects will become more clearly apparent by reference to the following description when taken in conjunction with the accompanying drawings, in which:

FIGURE 1 is used.

Figure 1:
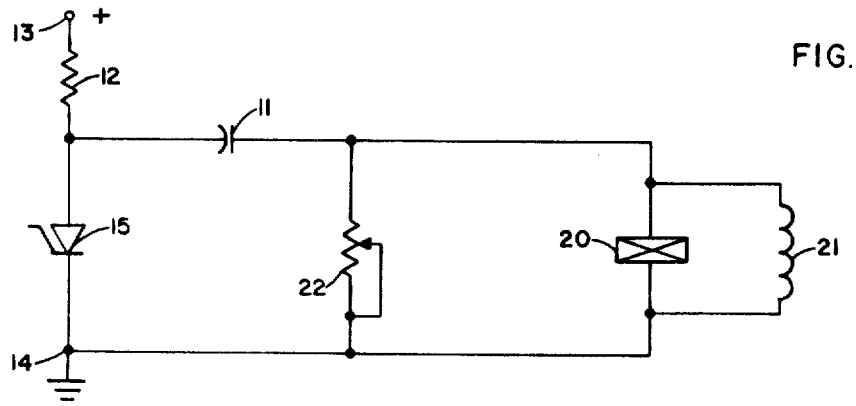
FIGURE 1 is an electrical circuit diagram showing the prior art.

Referring now to the figures and FIGURE 1 in particular, a source of direct current connected between the terminals 13 and 14 is adapted to charge via a current limiting resistor 12 a capacitor 11 which is coupled in series with the parallel connection of a piezoelectric transducer 20 and an adjustable damping resistor 22. The damping resistor is provided in order to adjust the wave train length through the transducer 20. An optional inductance 21 is connected across the transducer in order to tune the electrical circuit to the mechanical resonance of the transducer. A silicon controlled rectifier (SCR) 15 or a similar switching device is connected between one side of the capacitor 11 and the terminal 14 in order to provide, when rendered conductive, a low impedance discharge path for the capacitor 11. The circuit as shown is quite conventional and operation thereof may be visualized as follows:

The capacitor 11 is charged by being connected across the terminals 13 and 14 while the silicon controlled rectifier 15 is in its non-conductive state. Upon command, supplying a control signal to the control electrode of the rectifier 15, the rectifier is rendered conductive, thus providing a low impedance path across the power terminals of the rectifier and causing the capacitor 11 to discharge its charge through the rectifier 15, resistor 22 and transducer 20, which action, in turn, causes a change in potential across the transducer 20 and produces an ultrasonic wave train.

Figure 2:
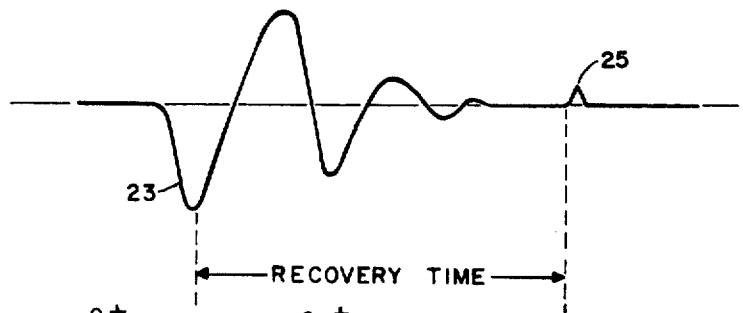
FIGURE 2 is a wave shape diagram of the voltage apparent across the ultrasonic transducer when a circuit per

FIGURE 2 shows the voltage signal across the transducer 20. Initially, the voltage across the transducer goes rapidly negative as seen by numeral 23. Thereafter, the voltage shows a damped oscillation, the frequency of which is dependent upon the capacitance of the transducer and the value of the inductance 21 coupled in parallel with the transducer. At the end of the recovery time a voltage spike 25 is apparent. This signal, interfering with the possible receipt of an echo signal and giving the appearance of a stationary echo signal, is caused by the rectifier 15 switching at the end of its recovery time from low impedance to a high impedance, that is, changing from its conductive to the non-conductive state. During the period that the rectifier 15 is in the low impedance condition, current flows from the terminal 13 through the resistor 12 and the rectifier 15 to the terminal 14. Immediately after the rectifier assumes its non-conductive state, the flow of current is switched from the terminal 13 via the resistor 12 to the capacitor 11 and through the transducer 20 as well as through the resistor 22 to the terminal 14, thereby causing the spike 25. As stated, this spike is undesired and interferes with measurements of echo signals.

The circuit per FIGURE 1 has one further disadvantage. As soon as the rectifier 15 is rendered conductive, it would be highly desirable to render it immediately thereafter non-conductive and return the circuit to its quiescent state. Unfortunately this is not the case and, a certain recovery time is needed for the rectifier 15 to return to its non-conductive state.

During the time the rectifier 15 is conductive, the capacitor 11 is coupled in parallel with the transducer 20, thereby causing a low impedance shunt path for any echo signal appearing on the transducer during such period. Therefore, during this particular time period an echo responsive output signal appearing across the transducer has a much lower signal level than during the time when the rectifier 15 is in its high impedance state.

Figure 3:
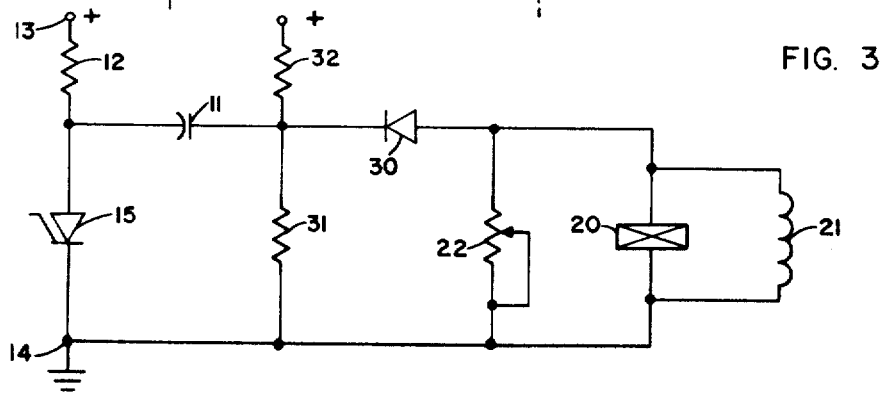
FIGURE 3 is an electrical circuit diagram of the improved arrangement.

These shortcomings have been eliminated by providing a modified electrical circuit as seen in FIGURE 3. The voltage applied across the capacitor 11 is identical with that in FIGURE 1. When the rectifier 15 is rendered conductive, the capacitor 11 discharges through the rectifier 15, the added rectifier 30 and the transducer 20. The rectifier (diode) 30 conducts current through the first negative going part 23 of the capacitor discharge cycle and conducts also current, by virtue of the inductance 21 acting as the driving source, during the first positive cycle on the transducer. Thereafter, the capacitor 11 is charged to the peak voltage of the first positive cycle. As the transducer voltage swings negative after the initial positive peak, the rectifier 30 blocks current flow and the capacitor is isolated from the transducer 20. While the recovery time of the rectifier 15 continues, the capacitor 11 discharges through the combination of resistors 31 and 32 and the rectifier 15. At the end of the recovery period the rectifier 15 reverts to its non-conductive state. At this moment, like described heretofore, the flow of current from the terminal 13 is switched to the capacitor 11 and, whereas in the circuit per FIGURE 1 the current passed also through the transducer 20, in the circuit per FIGURE 3 the rectifier 30 blocks such current flow to the transducer. The current now passes only through the capacitor 11 and the resistor 31, thereby eliminating the spike 25 previously occurring across said transducer.

By means of resistors 31 and 32 and a suitable source of potential the rectifier 30 is slightly reverse biased in order that echo signals appearing at the transducer 20 are blocked and do not bias the diode in the forward direction. Hence, the transducer 20 can provide an improved signal to the receiver circuit during the recovery time of the pulse circuit.

The diode rectifier 30 must be one which conducts current without appreciable time delay in order to pass fast forward current pulses and must be one without an appreciable recovery time period, otherwise its purpose would be defeated. A suitable diode is one commercially numbered FDH 600, available from Fairchild Semiconductor Division, 313 Fairchild Drive, Mountain View, Calif. 94041. It will be apparent that other and similar units may be substituted. Moreover it should be clearly apparent that the switching device 15, which described as a silicon controlled rectifier, could be also a thyratron tube or a four-layer diode and the like.

While there has been described and illustrated a certain preferred embodiment of my invention, it will be apparent to those skilled in the art that various changes and modifications may be made therein without deviating from the broad principles and intent of this invention.

What is claimed is:

1. A pulse circuit for an ultrasonic pulse-echo search unit which includes an ultrasonic transducer, coupled in series with a capacitor adapted to be alternately charged and discharged, and a switching means, the latter when non-conducting causing charging of the capacitor and when rendered conductive causing the capacitor to be discharged whereby to cause the generation of an ultrasonic wave train by said transducer, the improvement comprising:

a unidirectional current conducting device coupled in circuit between said capacitor and said transducer to suppress current flow from said capacitor to the transducer at the time the switching means changes from its conductive to its non-conductive state and causes the capacitor to become charged.

2. A pulse circuit as set forth in claim 1 and including means for biasing said unidirectional current conducting device to remain non-conductive in response to echo responsive signals generated by said transducer and reaching said unidirectional current conducting device.

3. A pulse circuit as set forth in claim 2 wherein said switching means is a silicon controlled rectifier and said unidirectional current conducting device is a diode having a very fast recovery period after current conduction.

4. A pulse circuit for an ultrasonic pulse-echo search unit comprising.

the series connection of an ultrasonic transducer, a rectifier and capacitor and a switching means, the latter adapted to be rendered alternately conductive or non-conductive;

means coupled for charging said capacitor from a source of direct current whereby such charge is adapted to be discharged through said switching means upon rendering said switching means conductive;

resistive means coupled in parallel with the partial series connection having said capacitor and switching means and the partial series connection having said transducer and said rectifier, and means applying a potential across said resistive means for biasing said rectifying means to preclude current conduction thereof in response to the generation of an echo responsive pulse signal across said transducer.

5. A pulse circuit for an ultrasonic pulse-echo search unit comprising:

the series connection of a capacitance, a silicon controlled rectifier and a first resistance, whereby said capacitance is adapted to be charged from a supply of voltage and discharged responsive to the condition of said controlled rectifier;

the series connection of a second resistance and a second rectifier connected in parallel with said first resistance;

a piezoelectric transducer and a parallel connected inductance connected in parallel with said second resistance and in series with said second rectifier, capacitance and controlled rectifier, and said second rectifier being connected to prevent current flow from said capacitance to the transducer when the silicon controlled rectifier is caused to change from its conductive state to its non-conductive state for charging said capacitance.

References Cited

UNITED STATES PATENTS 3,282,086  11/1966  McCorkindale et al. __ 73—67.8

RICHARD A. FARLEY, *Primary Examiner.*